United States Patent

[11] 3,621,066

| [72] | Inventors | Richard W. Anderson<br>Midland, Mich.;<br>Claude I. Merrill, Lancaster, Calif. |
|---|---|---|
| [21] | Appl. No. | 647,337 |
| [22] | Filed | June 20, 1967 |
| [45] | Patented | Nov. 16, 1971 |
| [73] | Assignee | The Dow Chemical Company<br>Midland, Mich. |

[54] SUBSTITUTED HALOCYCLOALKENES
7 Claims, No Drawings

[52] U.S. Cl. .................................................... 260/611 R,
  252/77, 252/65
[51] Int. Cl. ...................................................... C07c 41/00,
  C07c 43/18
[50] Field of Search ........................................... 260/611,
  611 R

[56] References Cited
UNITED STATES PATENTS
2,613,228  10/1952  Ruh ............................... 260/611
2,917,548  12/1959  Dixon ............................ 260/611 X
3,354,223  11/1967  Sweeney ........................ 260/611

OTHER REFERENCES

Fawcett et al. Jour. Amer. Chem. Soc., 84 (1962), pages 4275–4285

Barr et al., Jour. Amer. Chem. Soc. Vol. 72 (1950), pages 4480–4482

*Primary Examiner*—Bernard Helfin
*Attorneys*—Griswold and Burdick, C. Kenneth Bjork and L. S. Jowanovitz

ABSTRACT: Mono and diperhaloalkoxyperhalocycloalkenes and a method of their preparation are disclosed. These compounds exhibit excellent thermal stability and oxidative resistant characteristics when subjected to elevated temperatures.

SUBSTITUTED HALOCYCLOALKENES

BACKGROUND OF THE INVENTION

This invention relates to novel halo ether compounds based on perhalocycloalkenes and more particularly is concerned with perfluoroalkoxyfluorocycloalkenes, particularly perfluoroalkoxyfluorocyclobutenes, and to a method of their preparation.

It has been reported in the literature that carbonyl fluoride can react with fluoroolefins in the presence of a fluoride ion catalyst and a polar non protonic solvent to form fluoroacyl fluorides (Fawcett et al., J. Am. Chem. Soc., 84 4275 (1962). Further studies have shown that certain fluoroketones can be prepared by reaction of hexafluoropropene with various of the fluoroacyl fluorides. (Smith et al., J. Am. Chem. Soc. 84, 4285 (1962).

Summary

The present invention comprises perhaloalkoxy perhalocycloalkenes corresponding to the general

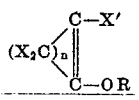

Formula (I)

wherein X is a member selected from the group consisting of fluorine and perfluoroalkyl groups, e.g. perfluoromethyl, R is a perhalo aliphatic group having from one to about 20 carbon atoms, preferably from one to about six carbon atoms, X' is a member selected from the group consisting of fluorine, chlorine, bromine and alkoxides (—OR) wherein the R is an aliphatic group of the same type as set forth directly hereinbefore and $n$ is the integer 2, 3 or 4.

These compounds are prepared by reacting a perhalocycloalkene with a perhaloalkoxide source material in the presence of an alkali metal fluoride.

DESCRIPTION OF PREFERRED EMBODIMENTS

One preferred embodiment of the present invention comprises mono and diperfluoroalkoxy perfluorocyclobutenes corresponding respectively to the formulas (II) and (III)

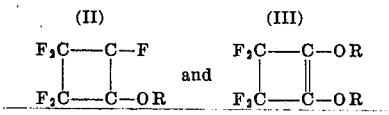

where R is a perfluoroaliphatic group having from one to about six carbon atoms.

The mono and diheptafluoroisopropoxide derivatives of perfluorocyclobutene are examples of specific preferred embodiments of the present invention.

The perfluoroalkoxycycloalkenes are of particular interest in that they contain only carbon, oxygen and fluorine as the elements comprising the molecule. The absence of chlorine and hydrogen imparts excellent thermal and oxidation resistance to these materials. Since they are liquids, these novel compounds, therefore, find utility as brake and other hydraulic fluids, electrical insulators, monomers for the preparation of heat and oxidation resistant polymers and the like applications wherein thermal and oxidative stability are required at high temperatures.

Those disclosed compounds which contain other halogens in the molecules are suitable for use in the same type of operations, although the maximum temperatures at which they can operate effectively may be somewhat lower than the perfluoro compounds.

In accordance with the present invention, the novel compounds ordinarily are prepared by reacting a perhalocycloalkene, e.g. 1,2-dichloroperfluorocyclobutene, perfluorocyclobutene, perfluorocyclopentene or perfluorocyclohexene with an alkoxide source material such as a perhalokentone or perhaloacyl fluoride in the presence of an alkali metal fluoride, e.g. potassium fluoride, and an inert aprotic organic polar solvent.

Usually, an addition product of the alkoxide source material, e.g. a perfluoroketone, and alkali metal fluoride is prepared by direct reaction of these reactants. The quantity of alkali metal fluoride to be employed ranges from about 0.001 weight percent, i.e. a catalytic amount, to about that required stoichiometrically for reaction with the ketone to form a 1:1 addition product. Preferably about stoichiometric quantities are employed to assure that the carbonyl compound reactant is in its salt form thus effectively serving to reduce the vapor pressure of the reaction mass. However, when X' is fluorine apparently the alkali metal fluoride serves as a catalyst or reaction promoter. Therefore, in the perfluoro systems, small quantities of alkali metal fluoride have been found to be satisfactory. In other systems, e.g. using 1,2-dihalo-substituted perfluorocycloalkene wherein the halogens on the 1,2 position are other than fluorine, stoichiometric or larger quantities of the alkali metal fluoride ordinarily are used.

The resulting addition product reactant and perhalocycloalkene in the presence of the inert solvent usually are maintained under the autogenous pressure generated by the reaction mass at a temperature of from about 0° to about 200° C., usually at from about 50° to about 150° C. for a period of from about 1 to about 100 hours or more and ordinarily from about 12 to about 48 hours. In most operations, the reaction mass is continuously agitated during this period.

Alternatively, the cycloalkene reactant, alkoxide source material and alkali metal fluoride can be introduced at the same time into a reaction vessel along with the solvent. It is not necessary to first separately prepare the carbonyl-alkali metal addition product.

Following the reaction period, usually the product mass is washed with water and the alkoxycycloalkene products recovered and purified as by fractional distillation, vapor phase chromatography or other liquid-liquid separatory procedures.

The relative quantities of perhalocycloalkene reactant and alkoxide source material to be employed are not critical; usually at a minimum about stoichiometric amounts as needed to provide the alkoxy product are used. Ordinarily an excess of the alkoxide reactant is used, e.g. up to about 500 weight percent of that required stoichiometrically. The actual quantities employed are those such that unwieldly large volumes are not encountered which would require large storage vessels, transportation systems and reactors.

In one preferred embodiment of the present invention, it has been discovered that with perfluorocyclobutene and perfluoroacetone considerable quantities of the corresponding diperfluoroalkoxy product are realized. With a 1,2-dihaloperfluorocyclobutene, wherein the 1,2-halo-substituents are other than fluorine usually only the monoalkoxy product is obtained.

Alkoxide source materials suitable for use in the present invention are the perhaloalcoholates, such as e.g. the alkali metal methylates, ethylates, propylates, butylates, cyclobutylates, cyclopentylates, (i.e. alkali metal alkoxides), perhaloketones, perhaloacyl halides, phosgene, carbonyl fluoride and the like. Specific examples of suitable ketone and aldehyde reactants are perfluoroacetone, perchloroacetone, mixed perhalosubstitued acetones such as dichlorotetrafluoroacetone, tetrachlorodifluoroacetone and monochloropentafluoroacetone, perfluoroacetyl fluoride, perfluorocyclopentanone, perfluorocyclohexanone and the like.

Solvents suitable for use are those aprotic polar organic liquids which are inert to the reactants and products and which will dissolve these materials. Conveniently, the higher boiling ethers such as β,β'-dimethoxy-diethyl ether (commonly referred to as diglyme,) N,N-dimethylformamide, acetonitrile, tetramethylene sulfone, N,N-dimethylacetamide and the like are employed as solvents.

The process usually is carried out under the autogenous pressure of the reaction mixture but either higher or lower pressures can be used.

The following examples will serve to further illustrate the present invention but are not meant to limit it thereto.

EXAMPLE 1

About 10 grams (0.063 gram mole) of perfluorocyclobutene

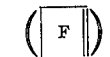

was transferred by low pressure (i.e., vacuum technique) into a pressure vessel containing about 0.125 gram mole of the 1:1 addition product of hexafluoroacetone and potassium fluoride in diglyme solvent. The addition product had been prepared by reacting at room temperature about 7.25 grams ( 0.125 gram mole) of potassium fluoride and about 20.8 grams (0.125 gram mole of hexafluoroacetone in 150 milliliters of diglyme.

The resulting mixture was heated with continuous stirring at about 95° C. for 24 hours under the autogenous vapor pressure of the mass. Following this reaction period, the product mixture was washed with water, dried, purified and analyzed.

The volatile materials were removed by subjecting the mass to a low pressure, the distillate being collected in a trap maintained at about minus 80° C.

The product collected in the cold trap was separated by gas chromatographic procedures and two products identified as monoperfluoroisopropoxyperfluorocyclobutene,

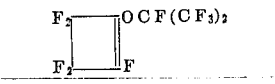

(~45 percent conversion, based on perfluorocyclobutene reactant) and di-perfluoroisopropoxyperfluorocyclobutene,

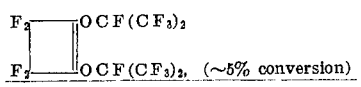

were recovered.

The structure of each of these compounds was established by a number of analytical techniques. The properties of the compounds are summarized as follows.
Monoperfluoroisopropoxyperfluorocyclobutene
 Chemical elemental analysis;
  Found    C–25.7 percent, F–69.4 percent
  Theo. Calc'd. C–25.6 percent, F–69.5 percent
 Nuclear Magnetic Resonance
 (standard-CFCL
  +80.7 Broad Triplet (5 Hz.) [CF$_3$]
  +119.6–120.1 Multiplet [CF$_2$-CF$_2$]
  +124.2 Multiplet (70 Hz.) [=CF]
  +140.6–140.9 Broad Doublet [OCF]
 Mass Spec.
 (In order of decreasing amounts)
 CF$_3$O$^+$, C$_3$F$_3^+$, CF$_3^+$, M$^+$ (molecular ion), (M$^+$-F), C$_4$F$_5$OC$_3$F$_6$, C$_4$F$_5$, C$_4$F$_4$O$^+$ The product was a clear, colorless liquid boiling at 72° C. at atmospheric pressure, i.e. about 750 mm. Hg.

Infrared Spectroscopy showed major absorbance peaks at 5.7, 7.3, 8.05, 8.6–8.9 (broad multiplet), 10.0 and 10.2–10.4 (doublet) microns. These are in accord and consistent with the assigned structure.
Diperfluoroisopropoxyperfluoroxyclobutene
 Chemical elemental analysis
  Found    C–24.5 percent, F–69.2 percent
  Theo. Calc'd. C–24.3 percent, F–69.2 percent
 Nuclear Magnetic Resonance (Standard-CFCL$_3$)
  +80.9 5or 7 lines (J≅1 Hz.) [CF$_3$]
  +117.0 Doublet (~15 Hz.) [CF$_2$]
  140.2 Singlet (~35 Hz.) at half ht. [OCF]
 Mass Spec. (In order of decreasing amounts)
 C$_6$F$_9$O$_2^+$, CF$_3^+$, C$_2$F$_2$O$^+$, C$_{10}$F$_{17}$O$_2^+$, M$^+$, C$_2$E$_4^+$, C$_3$F$_3^+$, C$_3$F$_2$O$^+$ The product was a clear, colorless liquid.

Infrared Spectroscopy showed major absorption peaks at 5.8, 7.4, 7.7, 8.0–8.2 (band), 8.5–9.2 (broad doublet), 10.1, 10.5 and 13.7 microns. These are in accord with the assigned structure.

A reaction mixture consisting of 5 grams (0.015 gram mole) of monopentafluorocyclobutenyl heptafluoroisopropyl ether and 3.4 grams (0.015 gram mole) of the 1:1 KF·(CF$_3$)$_2$CO adduct were reacted in 25 milliliters of acetonitrile in a pressure vessel reactor following the same general procedure as set forth hereinbefore. The reaction mixture was stirred while being heated at 95° C. for about 16 hours. A heavy, oily liquid (~4.7 grams) separated. Washing the remainder of the product mass with water gave another 0.5 gram of oil product. Separation by vapor phase chromatography showed about 50 percent conversion of the monoether to the disubstituted ether had been realized.

EXAMPLE 2

About 14.5 grams of potassium fluoride, 43.2 grams of hexafluoroacetone and 31.6 grams of 1,2-dichloroperfluorocyclobutene in about 250 milliliters of diglyme were reacted in a pressure vessel at about 100° C. for about 5 hours under the autogenous pressure of the reaction mass. Following this period, the volatile components were removed from the reactor by means of a low pressure (vacuum) system and passed through two cold traps, one maintained at about minus 80° C. and the other at about minus 196° C.

A novel compound identified as monoheptafluoroisopropoxy-1-chloro-perfluorocyclobutene was recovered in about 10 percent yield.

EXAMPLE 3

Following the general procedure described in example 1, about 5.0 grams (0.086 gram mole) of potassium fluoride, 7.0 grams (0.043 gram mole) of perfluorocyclobutene and 10 grams (0.086 gram mole) of perfluoroacetyl fluoride

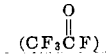

in 100 milliliters of diglyme solvent were heated for about 90 hours at about 95° C. under the autogenous pressure of the reaction mass.

Chromatographic separation of the product mass and analysis yielded mono-perfluoroethoxyperfluorocyclobutene.

This product had an infrared spectrum with absorbance peaks at 5.7, 7.2–7.4 (broad band), 8.1, 8.4–9.2 (broad multiplet) and 10.2–10.4 (broad band) microns which is consistent with the assigned structure.

The mass spectroscopy measurements served to confirm this structure.

EXAMPLE 4

About 1.5 grams (~0.01gram mole) of cesium fluoride was placed in a pressure vessel in a dry box. About 15 milliliters of acetonitrile solvent was then introduced into the vessel under a nitrogen atmosphere and the resulting mixture solidified by cooling to about minus 196°C. About 7.7 grams (0.117 gram mole) of carbonyl fluoride and 11.4 grams (~0.07 gram mole) of perfluorocyclobutene were transferred under a low pressure (vacuum technique) into the vessel. The resulting reactant mixture was heated at 95° C. for 64 hours. The volatile materials were transferred by vacuum from the reactor and the distillate collected in a cold trap.

Separation of the collected product by vapor phase chromatography gave monoperfluoromethoxyperfluorocyclobutene. The structure was established by analysis.

The infrared spectrum showed absorbance peaks at 5.7, 7.2–7.4 (doublet), 7.8, 8.2–8.7 (broad multiplet), 9.9–10.0 (broad peak) and 10.3 microns which substantiated the assigned structure. The mass spectroscopy analysis also was consistent with the structure.

In a manner similar to that set forth in the preceding Examples, halo ethers based on perfluorocyclopentene and perfluorocyclohexene can be prepared using alkoxide source materials disclosed herein.

Various modifications can be made in the present invention without departing from the spirit or scope thereof for it is understood that we limit ourselves only as defined in the appended claims.

We claim:

1. Perfluoroalkoxyperhalocycloalkenes corresponding to the formula:

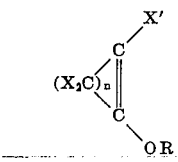

wherein X is fluorine, R is a perfluoro aliphatic group having from one to about six carbon atoms, X' is fluorine, chlorine or and $n$ is 2,3 or 4.

2. The compound as defined in claim 1 wherein X' is OR.

3. The compound as defined in claim 1 wherein R is the perfluoroisopropyl group, X' is a member selected from the group consisting of fluorine and OR and $n$ is the integer 2.

4. A process for preparing perfluoroalkoxyperhalocycloalkenes corresponding to the formula:

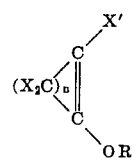

wherein X is a fluorine, R is a perfluoroisopropyl, X' is fluorine, chlorine or (-OR) and $n$ is 2,3 or 4 which comprises;

a. reacting at a temperature of from about 0° to about 200° C. for at least about 1 hour a perhalocyclobutene, perhalocyclopentene or perhalocyclohexene with perfluoroacetone in the presence of an alkali metal fluoride and an inert organic solvent, the quantities of said perhalocycloalkene and perfluoroacetone at a minimum being about that required stoichiometrically for formation of said perfluoroalkoxyperhalocycloalkene, the quantity of said alkali metal fluoride ranging from about 0.001 weight percent to about that required stoichiometrically to form a 1:1 addition product with the perfluoroacetone; and b. separating and recovering said perfluoroalkoxyperhalocycloalkene.

5. The process as defined in claim 4 wherein the reaction mass is heated in a sealed pressure reactor at from about 50° to about 150° C. for a period of from about 12 to about 48 hours under the autogenous pressure of the reaction mixture.

6. The process as defined in claim 4 wherein the perhalocycloalkene is perfluorocyclobutene.

7 The process as defined in claim 4 wherein the alkali metal fluoride is cesium fluoride.

* * * * *

UNITED STATES PATENT OFFICE
CERTIFICATE OF CORRECTION

Patent No. 3,621,066   Dated 16 November 1971

Inventor(s)  / Richard W. Anderson and Claude I. Merrill

It is certified that error appears in the above-identified patent and that said Letters Patent are hereby corrected as shown below:

Column 1, change formula (II) between lines 49 and 54 to:

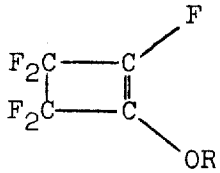

In column 3, line 23, change "( 0.125" to --(~0.125--; in line 59 change "(standard-CFCL" to --(Standard-CFCl$_3$)--.

In column 4, line 8, change "$C_2E_4$" to --$C_2F_4$--.

In column 5, line 29, insert --(-OR)-- after "or".

In column 6, line 10, change "wherein X is a fluorine," to --wherein X is fluorine,--.

In column 6, lines 32 and 33, delete all of Claim 7. It was cancelled.

In column 2, line 5, delete "perhalokentone" and insert --perhaloketone--.

Signed and sealed this 27th day of June 1972.

(SEAL)
Attest:

EDWARD M. FLETCHER, JR.        ROBERT GOTTSCHALK
Attesting Officer              Commissioner of Patents